US011258825B1

(12) United States Patent
Yang et al.

(10) Patent No.: US 11,258,825 B1
(45) Date of Patent: Feb. 22, 2022

(54) COMPUTER NETWORK MONITORING WITH EVENT PREDICTION

(71) Applicant: Trend Micro Incorporated, Tokyo (JP)

(72) Inventors: Chin-En Yang, Taipei (TW); Wen-Kwang Tsao, Taipei (TW); Yi-De Wu, Taipei (TW); Yu-Hsuan Chou, Taipei (TW); Jaime Yaneza, Jr., Irving, TX (US)

(73) Assignee: Trend Micro Incorporated, Tokyo (JP)

( * ) Notice: Subject to any disclaimer, the term of this patent is extended or adjusted under 35 U.S.C. 154(b) by 335 days.

(21) Appl. No.: 16/515,602

(22) Filed: Jul. 18, 2019

(51) Int. Cl.
*H04L 29/06* (2006.01)
*G06N 20/00* (2019.01)
*G06N 5/04* (2006.01)

(52) U.S. Cl.
CPC .............. *H04L 63/20* (2013.01); *G06N 5/04* (2013.01); *G06N 20/00* (2019.01); *H04L 63/1416* (2013.01); *H04L 63/1425* (2013.01)

(58) Field of Classification Search
CPC . H04L 63/20; H04L 63/1416; H04L 63/1425; G06N 20/00; G06N 5/04
USPC .......................................................... 726/23
See application file for complete search history.

(56) References Cited

U.S. PATENT DOCUMENTS

| | | | |
|---|---|---|---|
| 7,647,622 B1 | 1/2010 | Sobel et al. | |
| 8,365,278 B1 | 1/2013 | Njemanze et al. | |
| 8,370,947 B2 | 2/2013 | Zaitsev et al. | |
| 8,478,708 B1 | 7/2013 | Larcom | |
| 8,693,344 B1 | 4/2014 | Adams | |
| 8,800,036 B2 * | 8/2014 | Khayam | H04L 63/1425 726/23 |
| 9,367,694 B2 * | 6/2016 | Eck | G06F 21/55 |
| 9,552,550 B2 * | 1/2017 | Vasseur | H04L 45/08 |
| 9,693,237 B2 * | 6/2017 | Wang | H04W 16/22 |
| 10,122,740 B1 * | 11/2018 | Finkelshtein | H04L 63/1441 |
| 10,389,760 B2 | 8/2019 | Bryson et al. | |
| 10,477,342 B2 * | 11/2019 | Williams | H04W 4/021 |
| 10,862,910 B2 * | 12/2020 | Eguiarte Salazar | H04L 41/147 |
| 2006/0037075 A1 * | 2/2006 | Frattura | H04L 43/00 726/22 |
| 2006/0242705 A1 * | 10/2006 | Sadhasivam | H04L 63/1425 726/23 |
| 2010/0125912 A1 | 5/2010 | Greenshpon et al. | |
| 2011/0131658 A1 | 6/2011 | Bahl | |
| 2011/0252327 A1 | 10/2011 | Awasthi et al. | |
| 2012/0240185 A1 | 9/2012 | Kapoor et al. | |
| 2013/0055342 A1 * | 2/2013 | Choi | G06F 21/577 726/1 |
| 2013/0111548 A1 * | 5/2013 | Kanoun | H04L 63/1408 726/1 |
| 2013/0291088 A1 | 10/2013 | Rolette | |

(Continued)

*Primary Examiner* — Badri Narayanan Champakesan
(74) *Attorney, Agent, or Firm* — Patrick D. Benedicto (57) ABSTRACT

A cybersecurity system includes sensors that detect and report computer security events. Collected reports of computer security events are formed into state sequences, which are used as training data to train and build a prediction model. A current computer security event is detected and used as an input to the prediction model, which provides a prediction of a next computer security event. A monitoring level of a cybersecurity sensor is adjusted in accordance with the predicted next computer security event.

15 Claims, 5 Drawing Sheets

(56) References Cited

U.S. PATENT DOCUMENTS

| | | | |
|---|---|---|---|
| 2016/0300227 A1* | 10/2016 | Subhedar | H04L 63/1408 |
| 2017/0063908 A1* | 3/2017 | Muddu | G06F 40/134 |
| 2017/0220964 A1* | 8/2017 | Datta Ray | H04L 63/20 |
| 2017/0250954 A1* | 8/2017 | Jain | H04L 63/1416 |
| 2017/0265076 A1* | 9/2017 | Richards | H04W 12/128 |
| 2018/0183827 A1* | 6/2018 | Zorlular | H04L 63/1416 |
| 2018/0198812 A1* | 7/2018 | Christodorescu | H04L 63/1425 |
| 2018/0307833 A1* | 10/2018 | Noeth | H04L 63/1416 |
| 2019/0327252 A1* | 10/2019 | Grothendieck | H04L 63/1416 |

\* cited by examiner

COMPUTER NETWORK MONITORING WITH EVENT PREDICTION

BACKGROUND OF THE INVENTION

1. Field of the Invention

The present invention relates generally to cybersecurity.

2. Description of the Background Art

Computer networks may be protected from cyber threats using various cybersecurity modules, such as firewalls, intrusion prevention systems, antivirus programs, packet inspection devices, and the like. Still, today's cybercriminals are able to penetrate and compromise computer networks because of advanced and largely unknown cyber threats, which in the case of advanced persistent threats are designed to attack a particular computer network. Collecting data on these advanced cyber threats is relatively difficult without consuming large amounts of processing resources.

SUMMARY

In one embodiment, a cybersecurity system includes sensors that detect and report computer security events. Collected reports of computer security events are formed into state sequences, which are used as training data to train and build a prediction model. A current computer security event is detected and used as an input to the prediction model, which provides a prediction of a next computer security event. A monitoring level of a cybersecurity sensor is adjusted in accordance with the predicted next computer security event.

These and other features of the present invention will be readily apparent to persons of ordinary skill in the art upon reading the entirety of this disclosure, which includes the accompanying drawings and claims.

DESCRIPTION OF THE DRAWINGS

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
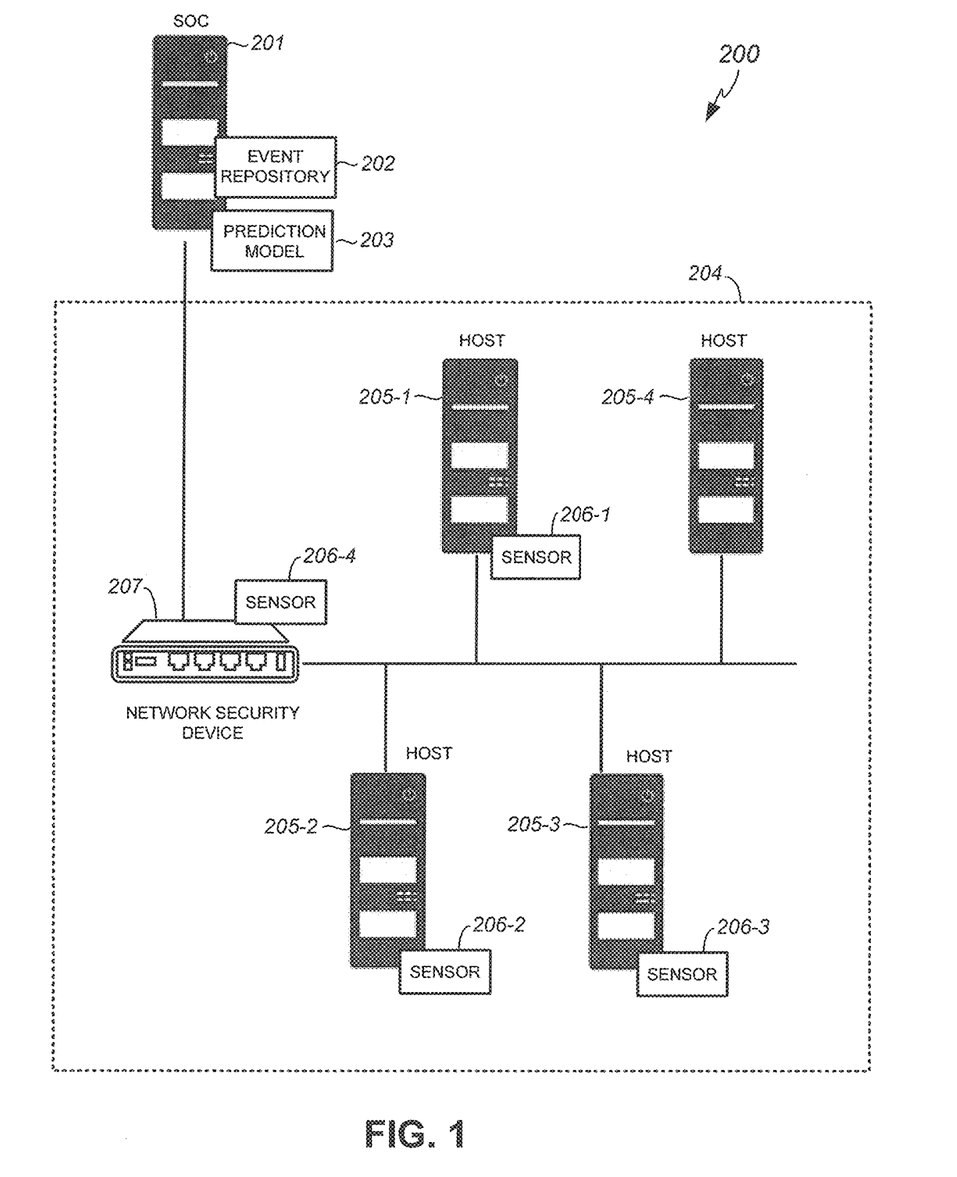
FIG. 1 is a logical diagram of a system for monitoring a computer network in accordance with an embodiment of the present invention.

FIG. 1 is a logical diagram of a system 200 for monitoring a computer network in accordance with an embodiment of the present invention. Data collected by the system 200 may be used for various cybersecurity applications including for protecting computer networks. In the example of FIG. 1, the system 200 includes a security operations center (SOC) server 201 that is configured to monitor and protect computers that are within a protection zone 204, which may be the perimeter of a private computer network. The SOC server 201 may be configured to monitor and protect computers of a plurality of protection zones 204, and thus a plurality of private computer networks.

A cybersecurity sensor 206 (i.e., 206-1, 206-2, . . . ) may be configured to detect a computer security event (also simply referred to as "event"), and to report the computer security event to the SOC server 201. A computer security event is so-named because it is an occurrence in the computer network that affects the security of the computer network. Computer security events may be predetermined and have assigned event identifiers (ID). Table 1 shows example computer security events that may be recognized, and accordingly detected, by a cybersecurity sensor 206.

TABLE 1

| ID | EVENT |
|---|---|
| 706 | Suspicious file |
| 140 | Network based exploit attempt |
| 2383 | Exploit activities for Point of Entry or Lateral Movement. |
| 2390 | SMB network protocol exploit activities. Host likely compromised. |
| 2429 | Exploit Attempt - SMB (Response) |
| . . . | |
| . . . | |
| . . . | |

In the example of table 1, an event 706 indicates that the cybersecurity sensor 206 detected a suspicious file (e.g., by file scanning), an event 140 indicates that the cybersecurity sensor 206 detected a network-based exploit attempt, etc. A cybersecurity sensor 206 may comprise software that is running on a host 205 (i.e., 205-1, 205-2, 205-3, . . . ), which is also referred to as an "endpoint sensor." A cybersecurity sensor 206 may also be implemented on a network security device 207 (e.g., an appliance, security router), which is also referred to as a "network sensor." As can be appreciated, the type and functionality of a cybersecurity sensor 206 depends on the implementation of the system 200. For example, a cybersecurity sensor 206 may be configured to scan files for malicious code and report an event of detecting a malicious or suspicious file as an event 706. As another example, a cybersecurity sensor 206 may be configured to monitor and inspect network packets that take advantage of a known exploit in the Server Message Block (SMB) protocol to gain entry to a host 205. A cybersecurity sensor 206 may follow rules for detecting events; the rules may be designed by cybersecurity researchers based on analysis of known cyber threats. The cybersecurity sensor 206 may be triggered to detect and report an event when a rule for detecting the event is satisfied.

Generally speaking, a cybersecurity sensor 206 may be implemented using conventional techniques for detecting and reporting events. In one embodiment, the cybersecurity sensors 206 are those employed by the Deep Discovery cybersecurity product, which is commercially-available from Trend Micro, Incorporated. In that embodiment, the events correspond to those detected in accordance with the Deep Discovery Inspection (DDI) rules. Other cybersecurity sensors may also be employed without detracting from the merits of the present invention.

In one embodiment, a cybersecurity sensor 206 is configured to have a plurality of monitoring levels. The monitoring level indicates how aggressive the cybersecurity sensor 206 is to collect, analyze, and report data. The more aggressive the level, the more thorough the cybersecurity sensor 206 monitors the computer network for events. For example, a cybersecurity sensor 206 that serves as a network sensor may only look for known malicious packets at a first level; look for known malicious packets and look for suspicious metadata (e.g., protocol names, packet size distribution) at a second level that is more aggressive than the first level; and look for known malicious packets, look for suspicious metadata, and record all network traffic at a third level that is more aggressive than the second level. As another example, a cybersecurity sensor 206 that is configured as an endpoint sensor may only look for known malicious activities at a first level; look for known malicious activities and send out data of the malicious activities at a second level that is more aggressive than the first level; and look for known malicious activities, send out data of the malicious activities, and do a memory dump at a third level that is more aggressive than the second level. As can be appreciated, a cybersecurity sensor 206 may have fewer or more monitoring levels.

Ideally, a cybersecurity sensor 206 is operated at its most aggressive monitoring level in order to collect as much and/or more insightful data as possible, not just to detect a cyber threat but also to learn more about the cyber threat and computers that may have been compromised by the cyber threat. However, running the cybersecurity sensors 206 at their most aggressive level would consume large amounts of network bandwidth and processing resources.

In one embodiment, the SOC server 201 comprises computer hardware and software that are configured to receive event data from one or more cybersecurity sensors 206, predict a next event using current event data, and adjust the monitoring level of a cybersecurity sensor 206 in accordance with the predicted event. Event data may comprise an identifier of a detected event, which sensor detected the event, the host impacted by the event, the timestamp of the occurrence of the event, etc.

In the example of FIG. 1, the SOC server 201 includes an event repository 202 and a prediction model 203. The event repository 202, which may be on a data storage device of the SOC server 201, may comprise a database or other module for logging and retrieving event data. In one embodiment, the SOC server 201 is configured to group related events into state sequences, group related events within a state sequence into states, and transform the states within a state sequence into time-series data by arranging the states in sequential, chronological order. The prediction model 203 may be, but not necessarily, generated using a Long Short-Term Memory (LSTM) Recurrent Neural Network (RNN) algorithm, with the state sequences as training data. Other suitable algorithms for generating a model for time-series prediction may also be employed.

The SOC server 201 may be configured to receive and log current events (i.e., newly reported events) from cybersecurity sensors 206 and input the current events to the prediction model 203, which generates a predicted event given the current events. The prediction model 203 may provide a prediction of a next event and also a measure of confidence (e.g., in terms of percentage of likelihood) of the prediction. The monitoring level of the cybersecurity sensors 206 may be adjusted in accordance with the predicted event. For example, if the prediction model 203 predicts that that the next event will be cryptojacking (i.e., unauthorized crypto mining), the SOC server 201 may command particular cybersecurity sensors 206 to perform more thorough monitoring, such as to monitor all or particular memory processes running on a host 205, to anticipate and record the cryptojacking. This allows the particular cybersecurity sensors 206 not only to detect and stop the cryptojacking, but also to collect more data (e.g., which processes are involved, etc.) that can assist cybersecurity researchers in preventing cryptojacking and related cyberattacks in the future.

Event monitoring, reporting, and recording using cybersecurity sensors are also referred to as "telemetry." As can be appreciated, embodiments of the present invention allow for smart telemetry in that the monitoring levels of the cybersecurity sensors can be adaptively set based on an anticipated, predicted event. The cybersecurity sensors can thus be operated at an aggressive monitoring level to collect as much event data as possible during periods when a particular event is predicted to occur. The cybersecurity sensors can be operated at a less aggressive monitoring level when the predicted event does not occur after a predetermined time, or after the occurrence of the predicted event.

A host 205 (i.e., 205-1, 205-2, . . . ) may comprise a computer of a protected zone 204, which in the example of FIG. 1 is the perimeter of a private computer network. That is, the hosts 205 may be mobile computers, desktop computers, and/or other computers of a private computer network. Likewise, the network security device 207 may comprise a network security appliance for scanning network traffic of the private computer network. In response to detection of a cyberattack, a host 205, network security device 207, and other computers of the private computer network may be configured to perform a response action to stop or prevent the cyberattack, such as by blocking malicious network traffic, deleting malware files, stopping execution of a malicious process, preventing unauthorized entry, etc.

In the example of FIG. 1, the SOC server 201 is part of an infrastructure of a managed detection and response (MDR) service. The SOC server 201 may communicate with other computers over the Internet, for example. Generally speaking, an MDR service provides out-sourced cybersecurity service to a plurality of subscribing private computer networks. The MDR service provides an "out-sourced" cybersecurity service in that it is not owned and operated by entities that own and operate subscribing private computer networks. As a particular example, the MDR service may be that provided by the assignee of the present application, Trend Micro, Incorporated, whereas the private computer network subscribing to the MDR service may be customers of Trend Micro, Incorporated. The out-sourced cybersecurity service is beneficial to private computer networks that do not have suitable infrastructure and/or experienced cybersecurity personnel. In other embodiments, the SOC server 201 or its functionality is provided by a host 205 of the private computer network.

Figure 2:
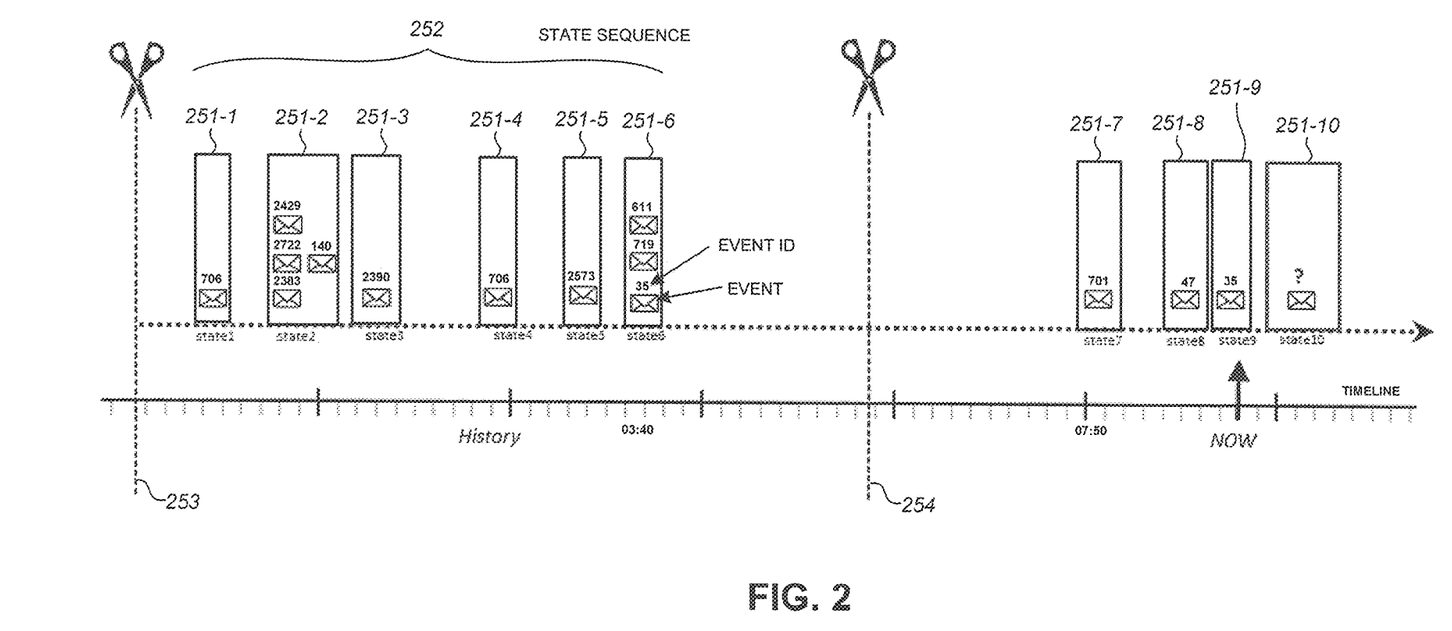
FIG. 2 shows a timeline of computer security events that are detected and reported by cybersecurity sensors in accordance with an embodiment of the present invention.

FIG. 2 shows a timeline of events detected and reported by cybersecurity sensors 206 in accordance with an embodiment of the present invention. The events are detected in chronological order from left to right. In the example of FIG.

2, each event is depicted as an envelope with a corresponding event identifier. In one embodiment, the events and their corresponding event data are stored in the event repository 202 of the SOC server 201 (see FIG. 1).

In one embodiment, related events are identified and formed into a group. The related events may be, but not necessarily, grouped together based on time. For example, events that occurred within a threshold time of each other may be deemed to be related events, and may thus be grouped together. On the other hand, events that did not occur within the threshold time are deemed to be independent events, and thus are not grouped together. As a particular example, assuming a threshold time of three hours, a first event that occurred within three hours of a second event may be grouped with the second event—the first and second events are deemed to be related. On the other hand, a third event that occurred more than three hours after the first and second events is not grouped with the first and second events. The third event is deemed to be an independent event, and is not related to either the first or second event. In the example of FIG. 2, events that occurred within a time point 253 and a time point 254 are deemed to be related events and are thus grouped together. This allows non-related events to be "cut" from the related events that occurred between the time points 253 and 254. As can be appreciated, related events may also be identified and grouped together using other suitable grouping scheme.

Because there are a plurality of cybersecurity sensors within a given protected zone, the same event or similar events may be detected and reported several times. Also, different cybersecurity sensors may report the same event differently. That is, different cybersecurity sensors may assign different event identifiers to the same event depending on the detection algorithm and role of the cybersecurity sensors. To alleviate this situation, in one embodiment, related events that have been grouped together are formed into a plurality of states. The same event or similar events may be, but not necessarily, identified and formed as a state based on time. For example, events that occurred within a threshold time window (e.g., within 2 seconds) may be formed as a single state.

A state may comprise one or more events. In the example of FIG. 2, the state 251-1 has a single event 706 (i.e., event with an identifier of 706); the state 251-2 has event 2429, event 2722, event 140, and event 2383; the state 251-3 has a single event 2390; etc.

In one embodiment, the states of a state sequence are transformed into time-series data by arranging the states in sequential, chronological order, i.e., in the order of occurrence. In the example of FIG. 2, the events occurring between time points 253 and 254 have been grouped together as members of a state sequence 252. The events of the state sequence 252 are further grouped into states 251-1, 251-2, 251-3, 251-4, 251-5, and 251-6. The states 251-1, 251-2, 251-3, 251-4, 251-5, and 251-6 are then arranged in sequential order to form the state sequence 252. As can be appreciated, the SOC server 201 may generate several state sequences from event data logged in the event repository 202. The state sequences may then be used by the SOC server 201 to train and build the prediction model 203.

In the example of FIG. 2, events that occurred before the time point 254 are also referred to as "historical events." The historical events are used in the training phase of the prediction model 203. Events that occurred after the time point 254 are also referred to as "current events." Current events may be input to the prediction model 203 to predict a next event in the application phase of the prediction model 203. In the example of FIG. 2, an event 701 is formed into a state 251-7, an event 47 is formed into a state 251-8, and an event 35 is formed into a state 251-9 in the manner described above. The event 701, event 47, and event 35 are current events. Given these current events, a next event of a next state 251-10 may be predicted by the prediction model 203 as trained using historical event data.

Figure 3:
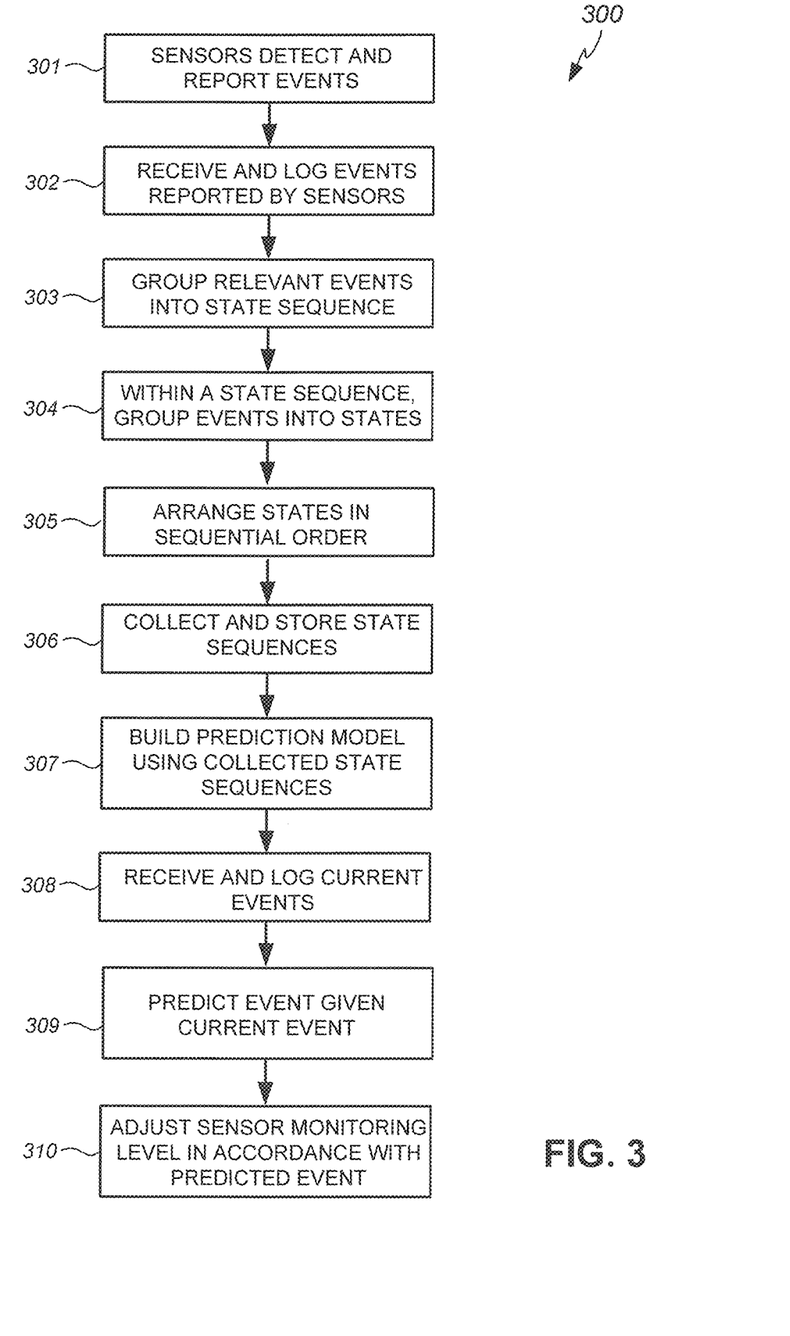
FIG. 3 shows a flow diagram of a method of monitoring a computer network in accordance with an embodiment of the present invention.

FIG. 3 shows a flow diagram of a method 300 of monitoring a computer network in accordance with an embodiment of the present invention. The method 300 may be performed by the SOC server 201. For example, the method 300 may be implemented as a software module comprising instructions that are stored in the memory of the SOC server 201, that when executed by the processor of the SOC server 201, cause the SOC server 201 to perform the method 300. As can be appreciated, the method 300 may also be implemented using other components without detracting from the merits of the present invention.

In the example of FIG. 3, cybersecurity sensors 206 detect events and report event data of the events to the SOC server 201 (step 301). The SOC server 201 receives and logs the events, e.g., occurrence and corresponding event data, in the event repository 202 (step 302).

In the example of FIG. 3, non-related events are identified and cut from related events. The related events are grouped together into a state sequence (step 303). The relatedness of events may be, but not necessarily, time-based. For example, two events with an occurrence time difference that is longer than a first predetermined threshold time difference (e.g., three hours) may be deemed to be independent, and thus not related, events. Accordingly, those two events are not put as members of the same state sequence. As can be appreciated, given the relatively large number of events that are logged in the event repository 202, a plurality of state sequences, each being a grouping of related events, will be formed.

Within each state sequence, events are further grouped into several states (step 304). The grouping of events into states may be, but not necessarily, time-based. The occurrence time difference between events of a state may be shorter than in step 303. For example, two events with an occurrence time difference that is longer than a second predetermined time difference (which is shorter than the first predetermined time difference of step 303) may be deemed to be different events, and thus do not belong in the same state. Put another way, two events that occur within the second predetermined time difference (e.g., within 2 seconds of each other) may be deemed to be the same event or similar events, and are thus included in the same state. The states of a state sequence are arranged in sequential order to complete the state sequence (step 305).

All of the state sequences are collected and stored in the event repository 202 (step 306). The prediction model 203 is built using the state sequences as training data (step 307). The prediction model 203 may be, but not necessarily, trained using the LSTM RNN algorithm.

The SOC server 201 may employ the prediction model 203 to predict an event that will occur in the future, and adjust the monitoring level of one or more cybersecurity sensors 206 in accordance with the predicted event. More particularly, after generation of the prediction model 203, the SOC server 201 continues to receive and log events that are reported by the cybersecurity sensors 206 (step 308). These events, which will be used as inputs to the prediction model 203 to predict a next event, are also referred to as "current events." A next event, i.e., an event that will occur in the future, may be predicted by the prediction model 203 given the current events (step 309). That is, current events may be input to the prediction model 203, which provides a prediction that is based on the training data used to build and train the prediction model 203. The SOC server 201 adjusts the monitoring level of one or more cybersecurity sensors 206 in accordance with the predicted event (step 310). For example, the SOC server 201 may command a cybersecurity sensor 206 to increase its monitoring level from a first level to a second level to collect more data on the predicted event.

It is to be noted that adjusting the monitoring levels of cybersecurity sensors in accordance with predicted events does not imply ignoring events that are not likely to happen. As can be appreciated, there are situations where low-probability events may still be worth monitoring due to their high severity if they do occur, and may thus be monitored periodically or base on some probability threshold depending on the particulars of the cybersecurity application.

Figure 4:
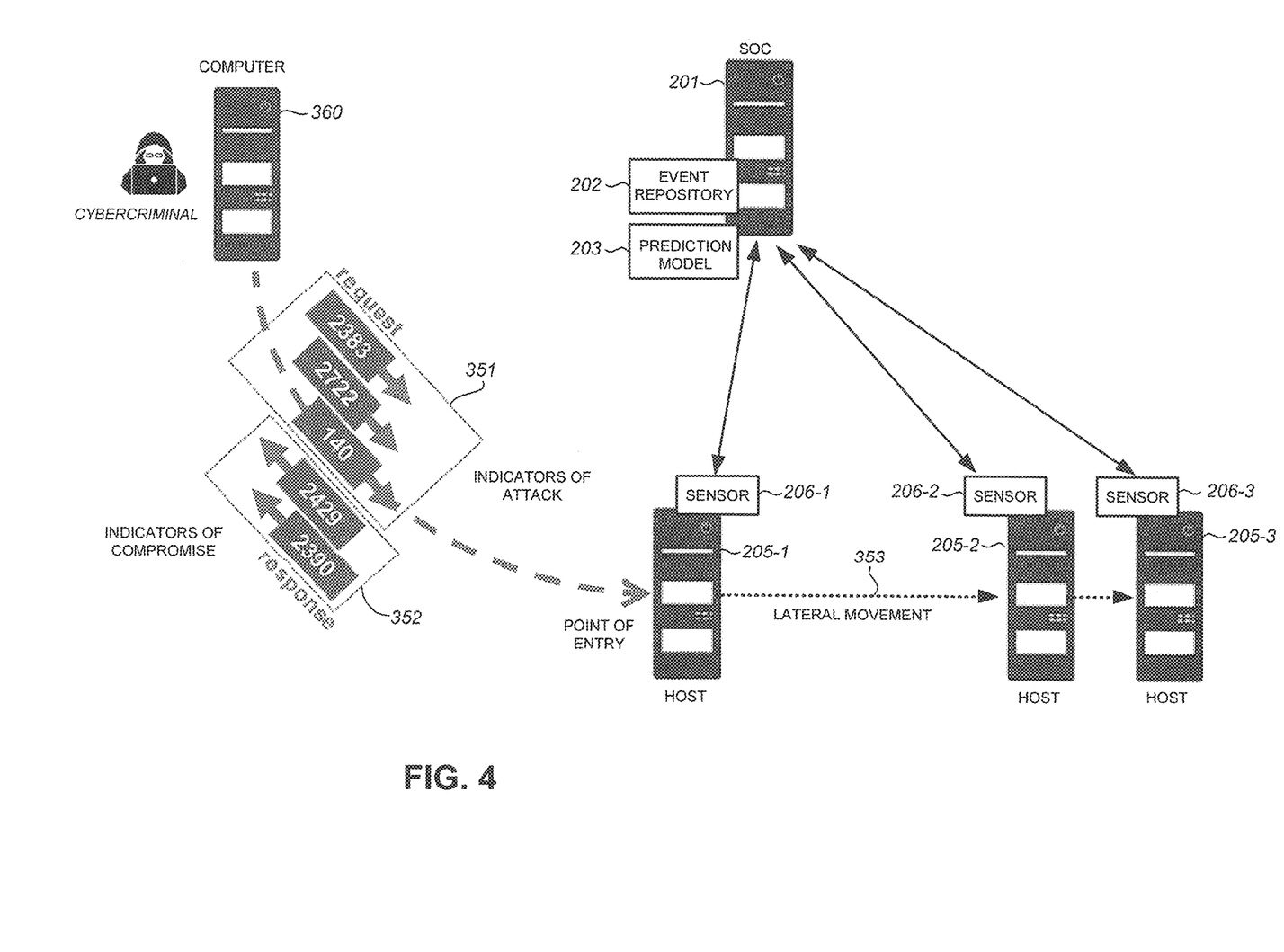
FIG. 4 shows a graphical illustration of an example operation of the system of FIG. 1 in accordance with an embodiment of the present invention.

FIG. 4 shows a graphical illustration of an example operation of the system 200 (see FIG. 1) in accordance with an embodiment of the present invention. In the example of FIG. 4, a cybercriminal accesses the host 205-1 using a computer 360. The access comprises a series of requests, which are detected by one or more cybersecurity sensors 206. The requests match indicators of attack (i.e., a cyberattack is being attempted), which satisfy predefined rules that trigger the cybersecurity sensors 206 to report corresponding events. In the example of FIG. 4, the requests are in the form of SMB packets that are recognized by the cybersecurity sensors 206 as matching rules for detecting event 2383, event 2722, and event 140 (see block 351). The cybersecurity sensors 206 report the events to the SOC server 201.

The requests generated a series of responses, which are also detected by the cybersecurity sensors 206. The responses match indicators of compromise (i.e., a cyberattack has been successful; the computer network has been compromised), which satisfy predefined rules that trigger the cybersecurity sensors 206 to report corresponding events. In the example of FIG. 4, the responses are in the form of SMB packets that are recognized by the cybersecurity sensors 206 as matching rules for detecting event 2429 and event 2390 (see block 352), which the cybersecurity sensors 206 report to the SOC server 201.

Figure 5:
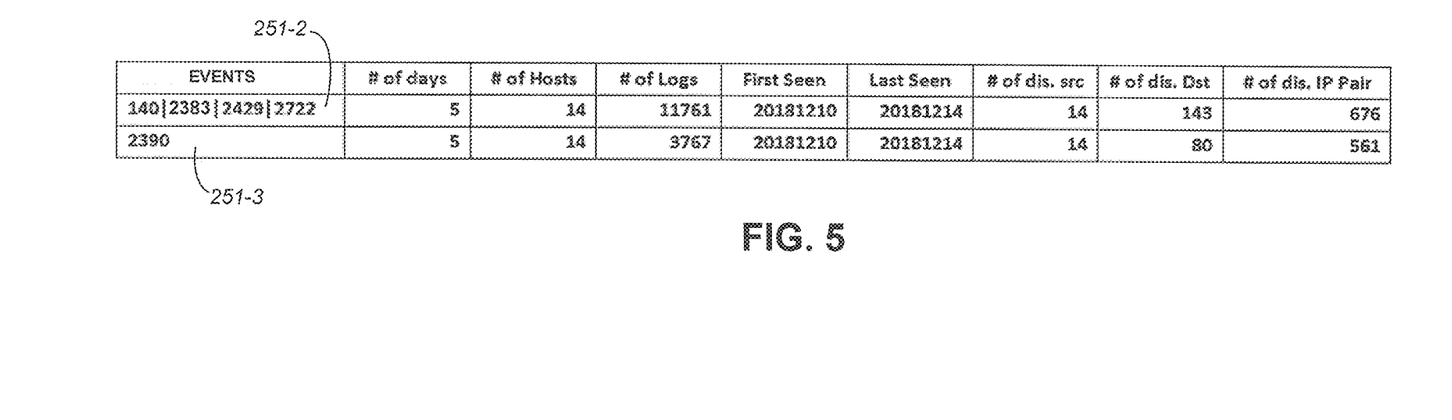
FIG. 5 shows example historical event data that were used to train and build a prediction model and that are relevant to the current event data of the cyberattack of FIG. 4, in accordance with an embodiment of the present invention.

FIG. 5 shows example historical event data that were used to train and build the prediction model 203 and that are related to the current event data of the cyberattack of FIG. 4, in accordance with an embodiment of the present invention. In the example of FIG. 5, the event 140, event 2383, event 2429, and event 2722 are members of a state 251-2 and the event 2390 is a member of a state 251-3, which are both states of the same state sequence 252 (shown also in FIG. 2). The historical event data of FIG. 5 indicate that the events of the state 251-2 have been detected for 5 days ("# of days") in 14 hosts ("# of hosts"), appear in 11,761 log entries ("# of logs"), are first detected on Dec. 10, 2018 ("First Seen"), and are last detected on Dec. 14, 2018 ("Last Seen"). Other relevant historical event data that have been logged, and may be useful for later correlation analysis, include the number of distinct connection source Internet Protocol (IP) addresses ("# of dis. src"), number of distinct connection destination IP addresses ("# of dis. Dst"), and number of distinct connection source/destination IP address pairs ("# of dis. IP pair") involved in the events. Similarly, in the example of FIG. 5, the event 2390 of the state 251-3 has been detected for 5 days in 14 hosts, appear in 3,767 log entries, is first detected on Dec. 10, 2018, is last detected on Dec. 14, 2018, involves 14 distinct connection source IP addresses, involves 80 distinct connection destination IP addresses, and involves 561 distinct connection source/destination IP address pairs. From these and other historical event data, the prediction model 203 is able to predict a next event that may follow after occurrence of current event 140, event 2383, event 2429, event 2722, and event 2390 in the cyberattack of FIG. 4. For example, other historical event data may indicate that more than 80% of events 2390 come repeatedly. As another example, other historical event data may indicate that 14% of hosts start doing cryptojacking after occurrence of an event 2390. The prediction model 203 takes all of these historical event data into account, as part of its training algorithm, to predict what the next event will be.

Given a predicted event, the SOC server 201 is now able to collect more data on the cyberattack of FIG. 4, and possibly perform some preemptive steps. For example, in the example of FIG. 4, a monitoring level of the cybersecurity sensor 206-1 may be adjusted to detect any new files that have been dropped, any configuration changes, which process uses a switch port within a time window, which process performs memory injection, etc. on the host 205-1. Also, the monitoring level of the cybersecurity sensors 206-2 and 206-3 may be adjusted to particularly monitor for lateral movements (see arrow 353) on the hosts 205-2 and 205-3, if the predicted event is lateral movement of the cyberattack. As can be appreciated, the cybersecurity sensors 206 cannot be left running at an aggressive monitoring level all the time, because process monitoring, looking for particular actions, and the like will slow down a host 205. Embodiments of the present invention thus allow for data collection and detection of cyberattacks, which otherwise would be missed by conventional cybersecurity solutions.

Figure 6:
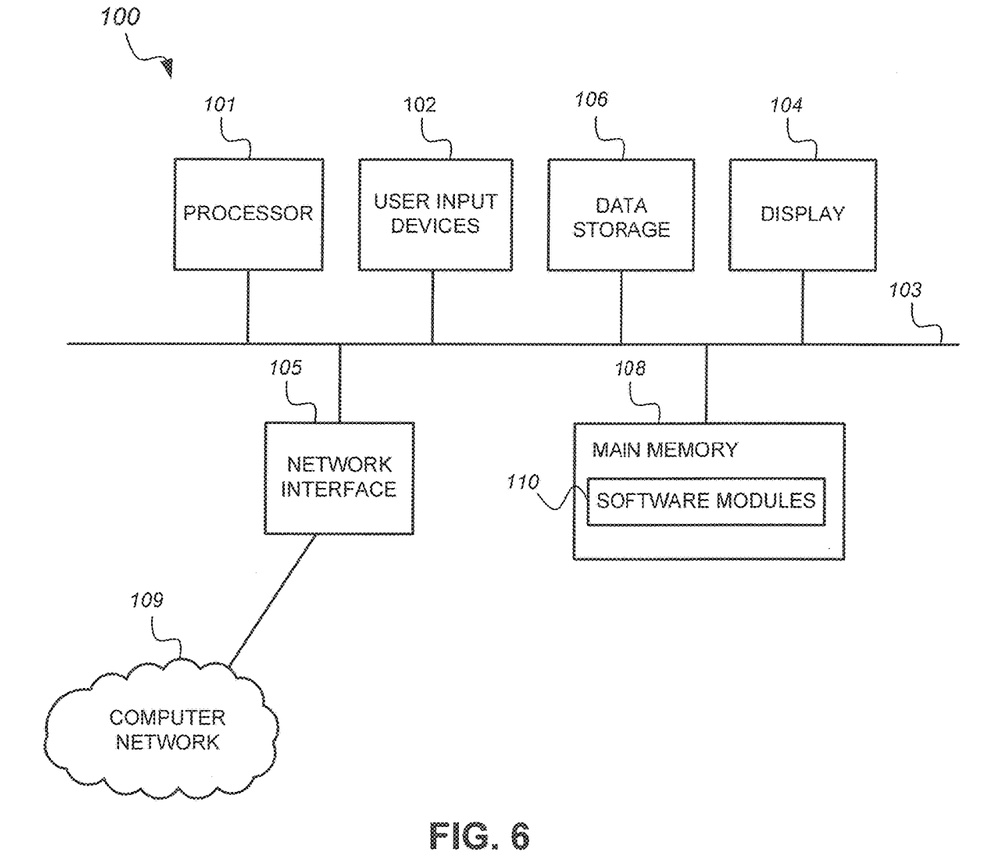
FIG. 6 shows a logical diagram of a computer system that may be employed with embodiments of the present invention.

Referring now to FIG. 6, there is shown a logical diagram of a computer system 100 that may be employed with embodiments of the present invention. The computer system 100 may be employed as an SOC server or other computer described herein. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory on the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110. In one embodiment where the computer system 100 is configured as the SOC server, the software modules 110 comprise instructions for collecting and logging events reported by cybersecurity sensors, building a prediction model, predicting events using the prediction model, and adjusting monitoring levels of cybersecurity sensors in accordance with predicted events.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
   detecting and logging a plurality of computer security events detected by a plurality of cybersecurity sensors of a computer network;
   training a prediction model using data of the plurality of computer security events;
   after training the prediction model, detecting a current computer security event in the computer network;
   predicting, using the prediction model, a next computer security event that will occur in the computer network given the current computer security event;
   adjusting a monitoring level of a cybersecurity sensor of the computer network to adjust an amount of data collected by the cybersecurity sensor in accordance with the next computer security event; and
   stopping a cyberattack detected based at least on the data collected by the cybersecurity sensor,
   wherein training the prediction model comprises: grouping related computer security events of the plurality of computer security events into a plurality of state sequences; for each state sequence of the plurality of state sequences, grouping similar member computer security events into a plurality of states; for each state sequence of the plurality of state sequences, arranging member states in sequential order; and training the prediction model using the plurality of state sequences as training data, and
   wherein the related computer security events of the plurality of computer security events are grouped into the plurality of state sequences based on time of occurrence of the related computer security events.

2. The method of claim 1, wherein member computer security events of each state sequence of the plurality of state sequences are grouped into states based on time of occurrence of the member computer security events.

3. The method of claim 1, wherein adjusting the monitoring level of the cybersecurity sensor comprises:
   adjusting the monitoring level of the cybersecurity sensor from a first monitoring level to a second monitoring level, wherein the cybersecurity sensor performs increased monitoring of the computer network at the second monitoring level than at the first monitoring level.

4. The method of claim 1, wherein the current computer security event is detected by a network appliance that monitors network traffic of the computer network.

5. The method of claim 1, wherein the cybersecurity sensor runs on a host computer of a private computer network.

6. The method of claim 5, wherein the monitoring level of the cybersecurity sensor is adjusted to monitor processes running on the host computer.

7. A system comprising:
   a first computer comprising a processor and a memory, the memory of the first computer storing instructions of a first cybersecurity sensor that is configured to monitor a computer network for computer security events;
   a second computer comprising a processor and a memory, the memory of the second computer storing instructions of a second cybersecurity sensor that is configured to monitor the computer network for computer security events;
   a third computer comprising a processor and a memory, the memory of the third computer storing instructions that when executed by the processor of the third computer cause the third computer to receive from the first cybersecurity sensor a report of a detected computer security event on the first computer, to predict a next computer security event in response to the detected computer security event, and to adjust a monitoring level of the second cybersecurity sensor to adjust an amount of data collected by the second cybersecurity sensor in accordance with the next computer security event; and
   a fourth computer comprising a processor and a memory, the memory of the fourth computer storing instructions that when executed by the processor of the fourth computer cause the fourth computer to stop a cyberattack detected based at least on the data collected by the second cybersecurity sensor,
   wherein the memory of the third computer stores instructions of a prediction model that is configured to predict the next computer security event given the detected computer security event,
   wherein the prediction model is trained using reported computer security events received from a network of cybersecurity sensors that includes the first and second cybersecurity sensors,
   wherein the prediction model is trained by grouping related computer security events of the reported computer security events into a plurality of state sequences; for each state sequence of the plurality of state sequences, grouping similar member computer security events into a plurality of states; for each state sequence of the plurality of state sequences, arranging member states in sequential order; and training the prediction model using the plurality of state sequences as training data, and
   wherein the related computer security events are grouped into the plurality of state sequences based on time of occurrence of the related computer security events.

8. The system of claim 7, wherein the first computer and the second computer are computers of a private computer network, the third computer is outside a perimeter of the private computer network, and the third computer communicates with the first and second computers over the Internet.

9. The system of claim 8, wherein the first computer is a security appliance that is configured to monitor network traffic of the private computer network.

10. The system of claim 7, wherein the detected computer security event comprises network packets that are in accordance with a Small Message Block (SMB) protocol.

11. The system of claim 10, wherein the network packets are indicators that a host computer on a private computer network has been compromised.

12. A computer-implemented method comprising:
    monitoring, by a first cybersecurity sensor, a computer network for computer security events;
    detecting, by a second cybersecurity sensor, a computer security event that is indicative of a cyberattack on the computer network;
    predicting a next computer security event given the detected computer security event;

adjusting a monitoring level of the first cybersecurity sensor to adjust an amount of data collected by the first cybersecurity sensor in accordance with the next computer security event; and stopping the cybersecurity attack based at least on the data collected by the first cybersecurity sensor, wherein predicting the next computer security event comprises: collecting reports of a plurality of computer security events from a plurality of cybersecurity sensors; grouping related computer security events of the plurality of computer security events into a plurality of state sequences; for each state sequence of the plurality of state sequences, grouping member computer security events into a plurality of states; for each state sequence of the plurality of state sequences, arranging member states in sequential order; training a prediction model using the plurality of state sequences as training data; and consulting the prediction model using the detected computer security event, wherein the related computer security events of the plurality of computer security events are grouped into the plurality of state sequences based on time of occurrence of the related computer security events.

13. The method of claim 12, wherein the monitoring level of the first cybersecurity sensor is adjusted to perform increased monitoring of the computer network for computer security events.

14. The method of claim 12, wherein the detected computer security event comprises network packets that are in accordance with the Small Message Block (SMB) protocol, and the network packets match rules indicating that the computer network has been compromised.

15. The method of claim 12, wherein the first cybersecurity sensor runs on a host computer.

\* \* \* \* \*